Oct. 16, 1934.    L. M. PERSONS    1,976,963
AIR COOLING AND DEHUMIDIFYING SYSTEM
Filed Jan. 13, 1933
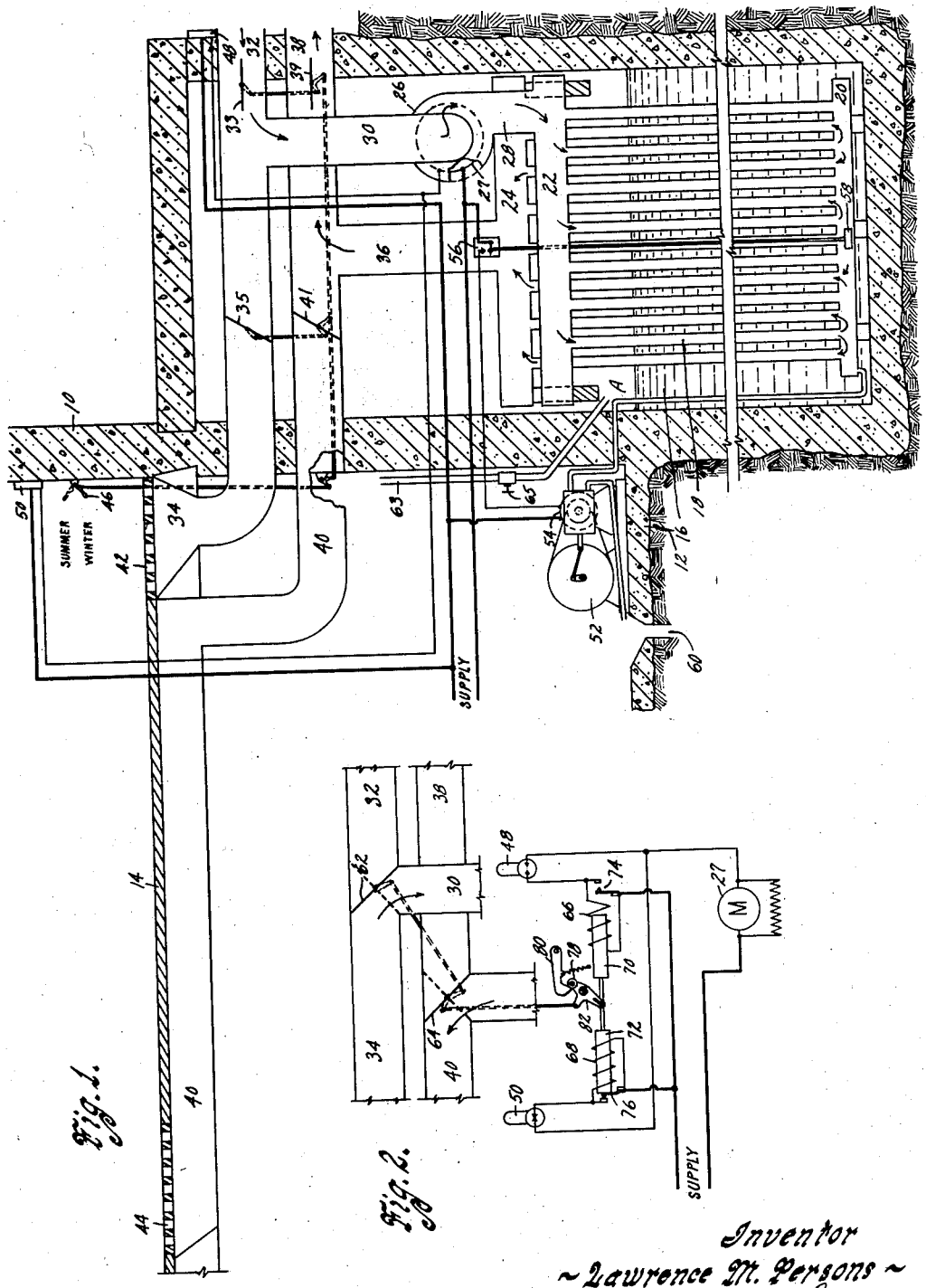
Inventor
~ Lawrence M. Persons ~
By Bair, Freeman & Sinclair
Attorneys
Witness
H. S. Wumjenmaier Patented Oct. 16, 1934

1,976,963

UNITED STATES PATENT OFFICE 1,976,963

AIR COOLING AND DEHUMIDIFYING SYSTEM

Lawrence M. Persons, Des Moines, Iowa, assignor to Penn Electric Switch Co., Des Moines, Iowa, a corporation of Iowa Application January 13, 1933, Serial No. 651,522

10 Claims. (Cl. 62—109)

An object of my present invention is to provide an air cooling and dehumidifying system which is comparatively simple to manufacture and install, besides being durable and inexpensive.

A further object is to provide an air cooling and dehumidifying system in which advantage is taken of cold weather in the winter time to produce ice, which can be used in the summer time for cooling and dehumidifying the air of a room or the like.

More particularly, it is my object to provide a reservoir with a freezable liquid therein and a system of air pipes submerged in the liquid for circulating cold air in the winter time to freeze the liquid and room air in the summer time to cool and dehumidify such air in a room.

Still a further object is to provide a blower in connection with the submerged air pipes for circulating the cold and room air in the winter and summer respectively, dampers being provided for controlling the flow of the air so that it can be received from and discharged to outside atmosphere in the winter time and received from and discharged into a room in the summer time.

Still a further object is to provide automatic temperature actuated controls for the blower and dampers and to provide an automatic condensation pump for disposing of the water of condensation which accumulates in the air pipes in the summer time because of dehumidifying the air.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a diagrammatic side elevation of a system embodying my invention; and Figure 2 is a diagrammatic view of a damper control arrangement.

On the accompanying drawing, I have used the reference numeral 10 to indicate the side of a house or building. A basement floor is indicated at 12 and a ground floor at 14. Outside the wall 10 a reservoir A is built, for instance, of concrete and constructed similar to a cistern or the like. The reservoir A is adapted to contain a freezable liquid 16 such as water.

Submerged in and extending through the water 16 is a plurality of air pipes 18. These are connected at their lower ends to a manifold 20 and at their upper ends, half of them, to an intake manifold 22 and half to an outlet manifold 24.

A blower is indicated at 26 and it has a discharge pipe 28 which is connected with the intake manifold 22. The blower has an intake pipe 30 connected with an outdoor intake pipe 32 and with an indoor intake pipe 34. Dampers 33 and 35 are provided for controlling the flow of air from the pipes 32 and 34 to the pipe 30.

The outlet manifold 24 is connected by an outlet pipe 36 to an outdoor outlet pipe 38 and an indoor outlet pipe 40. The inlet and outlet pipes 34 and 40 may be covered by grills or registers 42 and 44. Dampers 39 and 41 control the flow of air from the pipe 36 to the pipes 38 and 40.

The dampers 33, 35, 39 and 41 are preferably linked together so that they can all be controlled from one manual control device 46. The control device 46 is in the form of a lever which is connected by links and levers with the dampers, all as clearly shown in Figure 1.

A motor 27 is provided for operating the blower 26. It is controlled by an outdoor thermostat 48 and an indoor thermostat 50. The thermostat 48 may be set for closing the circuit when the outdoor temperature goes below 25° F., for instance when the freezable liquid 16 is water and for opening the circuit when the outdoor temperature rises above 25° F. The indoor thermostat 50 can be set for operation around 80° F. for instance.

Water of condensation collects in the manifold 20 during the summer time. In order to dispose of this water, I provide a water pump 52 operated by an electric motor 54. The motor 54 is controlled by a float switch 56 and a float 58 so that when a slight amount of the water collects in the manifold 20, it will be automatically pumped therefrom to a sewer 60 or other suitable drain.

For maintaining a proper supply of liquid 16, a supply pipe 63 may be provided and a control valve 65 may be used for admitting additional liquid to the reservoir A when desired.

In Fig. 2, I have shown an automatic control for the damper arrangement. A single damper 62 takes the place of the dampers 33 and 35 and a single one 64 takes the place of the dampers 39 and 41. The dampers 62 and 64 are shown in position for causing circulation of air from and to the room in which the thermostat 50 is mounted. When reversed to their dotted line positions, they cause the blower to receive air from outside atmosphere and discharge it to outside atmosphere.

The thermostats 48 and 50, besides controlling the blower motor 27, control solenoids 66 and 68 which in turn act upon armatures 70 and 72 to attract them, depending on which coil is energized. The armature 70 when attracted will close a short circuiting switch 74, while the armature 72 when attracted will close a short circuiting switch 76.

The armatures 70 and 72 are constrained to remain in either position to which they are drawn by the solenoids 66 and 68 by a roller 78 and a spring urged V cam 80. The roller 78 is mounted on a lever 82 which is actuated by the armatures 70 and 72 and which is connected by levers and links with the dampers 62 and 64, as clearly shown in Figure 2.

*Practical operation*

In the operation of my system, assuming the parts to be in the position of Figure 1, the thermostat 48 when closed because of subfreezing weather, will energize the motor 27 and thereby cause the blower 26 to circulate air through the pipes 18. This air will freeze the water 16 by absorbing the heat therefrom and discharging it to outside atmosphere. In the spring when the outdoor temperature is above freezing, the dampers 33, 35, 39 and 41 can be reversed for summer operation of the system.

When the thermostat 50 then closes, it will cause operation of the blower 26 and air will be taken from the room in which the thermostat is mounted, circulated through the pipes 18 and returned into the room. In its passage through the pipes 18 it will be cooled because of the ice around the pipes and will be dehumidified because of striking the cold surfaces of the pipes 18, thus making the air more comfortable in the room.

The water of condensation will raise the float 58 for closing the float switch 56 whereupon the condensate is removed from the manifold 20 by the pump 52. When the level of the water has receded sufficiently, the float switch 56 will return to open position. Before freezing weather again occurs, the control 46 is swung to the position of Figure 1 for winter operation of the system.

In Figure 2, the dampers for controlling the flow of air are automatically actuated instead of having to be manually actuated each spring and fall. In the spring when the indoor thermostat 50 closes, the coil 68 will be energized for attracting the armature 72 to operate the dampers to the full line position of Figure 2. As soon as they assume this position, the short circuiting switch 76 is closed, thus shorting out the coil 68 so that it need not be constantly energized whenever the thermostat 50 is closed. The cam 80 and rollers 78 tend to retain the switch 76 in closed position.

In the fall when the thermostat 48 first operates, the coil 66 will be energized and the armature 70 attracted whereupon the switch 74 will be closed for shorting out the coil 66.

A system of the character described makes it possible to dissipate heat in the winter time from the reservoir A so that the reservoir can absorb heat in the summer time for thus cooling and dehumidifying the air in a room or rooms to which the system is connected. All of this is accomplished with only the expenditure of electrical energy for operating the blower 26 and the pump 52.

The capacity of the system, of course, can be regulated for the requirements of the particular room or rooms it is desired to cool and dehumidify in the summer time.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In an air cooling and dehumidifying system, a reservoir, a freezable liquid therein, an air pipe extending through said liquid, means for circulating air through said pipe and automatic temperature actuated means for controlling the flow of said air to cause it to be either received from and discharged to outside atmosphere only or received from and discharged into a room only.

2. In an air cooling and dehumidifying system, a reservoir, a freezable liquid therein, an air pipe extending through said liquid, means for circulating air through said pipe, temperature actuated means responsive to outdoor temperature for causing said air to be received from and discharged to outside atmosphere and temperature actuated means responsive to indoor temperature for causing said air to be received from and discharged into a room.

3. In an air cooling and dehumidifying system, a reservoir, a freezable liquid therein, an air pipe extending through said liquid, blower means for circulating air through said pipe, temperature actuated means responsive to outdoor temperature for operating said blower means and causing said air to be received from and discharged to outside atmosphere and temperature actuated means responsive to indoor temperature for operating said blower means and causing said air to be received from and discharged into a room.

4. In an air cooling and dehumidifying system, a reservoir, a freezable liquid therein, an air pipe extending through said liquid, means for circulating air through said pipe, automatic temperature actuated means for controlling the flow of said air to cause it to be either received from and discharged to outside atmosphere only or received from and discharged into a room only, means for pumping condensation from said pipe and a controller for said means responsive to the quantity of condensate collected.

5. In a system of the character disclosed, a reservoir, a freezable liquid therein, an air pipe submerged in said liquid, blower means for forcing air to circulate through said pipe and automatic temperature actuated damper means for controlling the flow of said air to cause it to be received from and discharged to outside atmosphere or received from and discharged into a room.

6. In a system of the character disclosed, a reservoir, a freezable liquid therein, an air pipe submerged in said liquid, blower means for forcing air to circulate through said pipe, damper means for controlling the flow of said air to cause it to be received from and discharged to outside atmosphere or received from and discharged into a room and temperature actuated mechanism for controlling said damper means.

7. In a system of the character disclosed, a reservoir, a freezable liquid therein, an air pipe submerged in said liquid, blower means for forcing air to circulate through said pipe, damper means for controlling the flow of said air to cause it to be received from and discharged to outside atmosphere or received from and discharged into a room and temperature actuated mechanism for controlling said damper means, said mechanism being responsive to outdoor and indoor temperatures.

8. In a system of the character disclosed, a reservoir, a freezable liquid therein, an air pipe submerged in said liquid, blower means for forcing air to circulate through said pipe, damper means for controlling the flow of said air to cause it to be received from and discharged to outside atmosphere or received from and discharged into a room and temperature actuated mechanism for controlling said damper means, said mechanism being responsive to outdoor and indoor temperatures and controlling the energization of said blower means.

9. In a system of the character disclosed, a reservoir, a freezable liquid therein, an air pipe submerged in said liquid, blower means for forcing air to circulate through said pipe, damper means for controlling the flow of said air to cause it to be received from and discharged to outside atmosphere or received from and discharged into a room and temperature actuated mechanism for controlling said damper means, said mechanism being responsive to outdoor and indoor temperatures and causing operation of said blower means only during weather colder than required to freeze said liquid and when the temperature in said room is above a predetermined degree.

10. In a system of the character disclosed, a reservoir, a freezable liquid therein, an air pipe submerged in said liquid, electric blower means for forcing air to circulate through said pipe, thermostat means for controlling the flow of said air to cause it all to either be received from and discharged to outside atmosphere or to be received from and discharged into a room, thermostat means for controlling the energization of said blower and means for removing the water of condensation from said pipe.

LAWRENCE M. PERSONS.